L. Chapman.
Gang Plow.
N° 92,016. Patented Jun. 29, 1869.

Witnesses:
Edwin E. Marvin
Roger Wells

Inventor:
Luke Chapman
by W. E. Simonds
Atty

United States Patent Office.

LUKE CHAPMAN, OF COLLINSVILLE, CONNECTICUT, ASSIGNOR TO HIMSELF AND COLLINS COMPANY, OF SAME PLACE.

Letters Patent No. 92,016, dated June 29, 1869.

---

IMPROVEMENT IN GANG-PLOWS.

---

The Schedule referred to in these Letters Patent and making part of the same.

---

*To all whom it may concern:*

Be it known that I, LUKE CHAPMAN, of Collinsville, in the county of Hartford, and State of Connecticut, have invented a new and useful Improvement in Gang-Plows; and I declare the following to be a full and exact description thereof, reference being had to the accompanying drawings, and to the letters of reference marked thereon, forming a part of this specification.

My improvement admits of the use of any desired number of plows; but for convenience' sake, in this specification and these drawings, I have represented but two. Further on I will show how this number can be readily increased.

My gang-plow admits of four different positions of adjustment, which I designate herein as the first, second, third, and fourth adjustments respectively.

Figure 1 is a perspective view of the whole machine in the first position of adjustment, which is for the ordinary transportation of the plow over common roads, or from the barn to the field, and the like.

Figures 6, 7, 8, and 9, are for showing the construction of a peculiarly-shaped joint, of what is known herein as the "wheel-lever" to the end of what is known herein as crank-arm $j$.

The same letters always indicate the same parts in all the drawings.

My plow has but two wheels, the "furrow-wheel" $a$, which runs in the furrow, and the "land-wheel" $b$, both of the same size.

The letter $c$ indicates the pole.

The frame $d$ is bolted to the rider $g$, which rider is made of metal, flat, and extending over the greater part of the axle proper $s'$, is pivoted or hinged to it at each end.

The rider is slotted, for the hand-lever $h$ to vibrate in.

The lever $h$ is fastened rigidly to the axle proper, $s'$, and vibrates on the rack $o$, and is made to stop at any desired point on the rack, by any of the ordinary devices in use for such purposes.

At both ends of the axle proper, $s'$, are rigidly fastened two crank-arms, $j$ and $k$, of equal length.

The crank-arm $k$ pivots directly to the land-wheel $b$; the crank-arm $j$ is jointed at its lower end to the wheel-lever $l$. This joint is a peculiar one.

In fig. 6 is given a view of the lower extremity of the crank-arm $j$, as yet unjointed, the observer standing just outside the furrow-wheel $a$.

In fig. 7 the same is shown, the observer standing in front of the axle.

In fig. 8 the same is shown, the observer standing in rear of the axle.

To the inner side of wheel-lever $l$ is fastened the other part of this joint, which is precisely like it, except that it is put on to the lever $l$, the other end up, so that the two parts of the joint may fit together.

The effect of this joint is, that the wheel-lever $l$ can vibrate, with reference to crank-arm $j$, only a quarter of a circle; that is, supposing the crank-arm $j$ to stand perpendicular, the lever $l$ can be made to vibrate from the same perpendicular to a horizontal, as shown in fig. 9, and only this movement can take place.

At either extremity of this vibration, the shoulders of the two parts of the peculiarly-constructed joint abut against each other, and prevent further vibration.

As has just been said, relatively to the crank-arm $j$, only the vibration just described can take place; but as the crank-arm $j$ is itself rotated to different positions in the various adjustments by means of the hand-lever $h$, the wheel-lever $l$ may, of course, be made to assume other than these positions, with reference to the frame of the machine.

Figure 1:
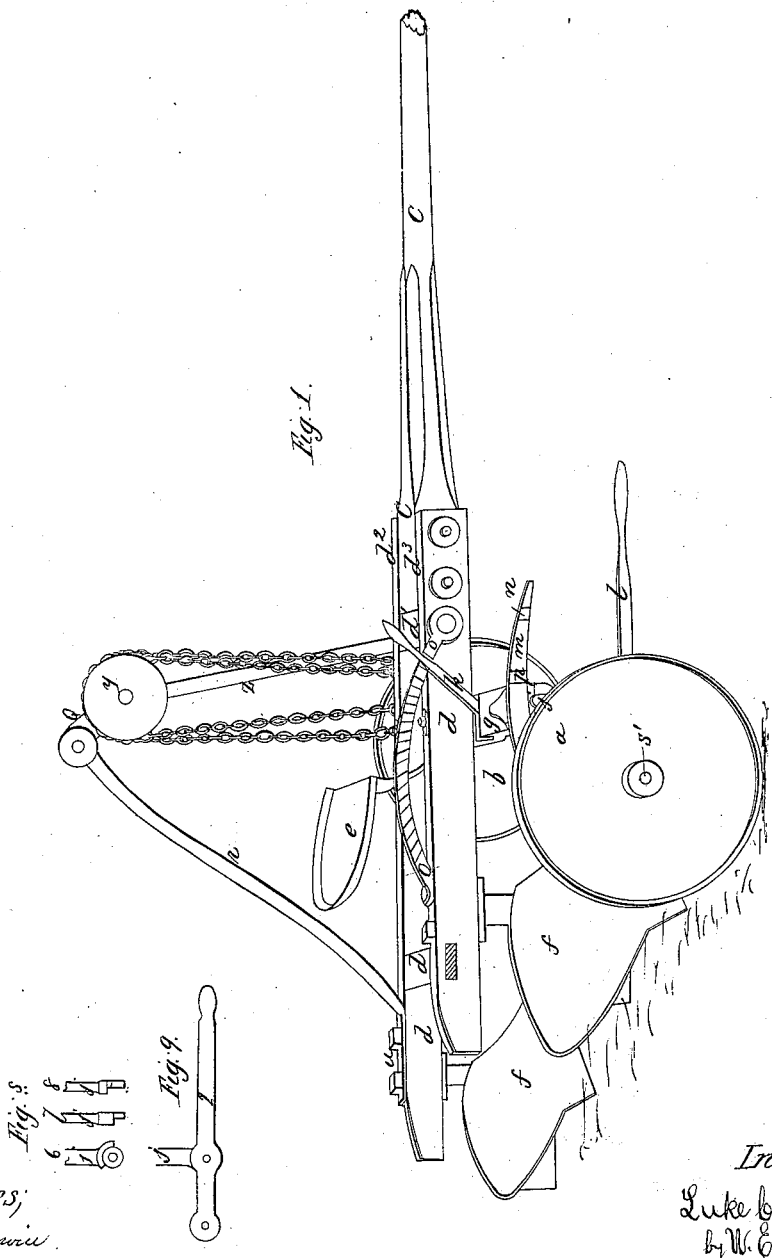

Now, to explain how the different adjustments are produced:

For transportation, fig. 1, throw hand-lever $h$ forward to the first notch in rack $o$, and the wheel-lever $l$ directly forward. The wheels are now both on a level, the plows are lifted from the ground, and the plow is ready for travel.

Figure 2:
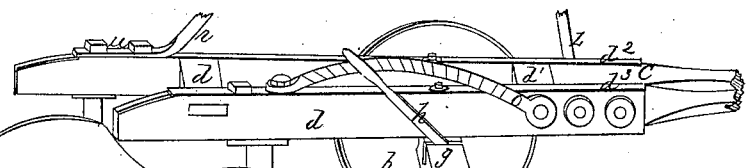
Figure 2 is a view of the plow in the second position of adjustment, which is for taking the first furrow.
Figure 5:
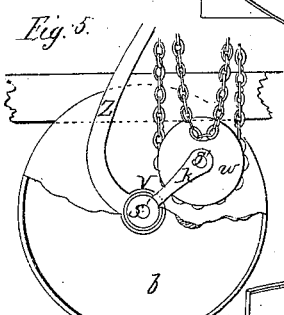
Figure 5 shows the "land-wheel" of the device, with the upper part of the wheel broken off, for the purpose of showing the lower part of the lifting-apparatus, to be hereinafter described.

To take the first furrow, fig. 2, throw wheel-lever $l$ back as far as it will go, and the hand-lever $h$ as far back as is desired for the intended depth of furrow. The furrow-wheel is now lifted off the ground, and when the team starts, the plows must, of necessity, take the earth.

Figure 3:
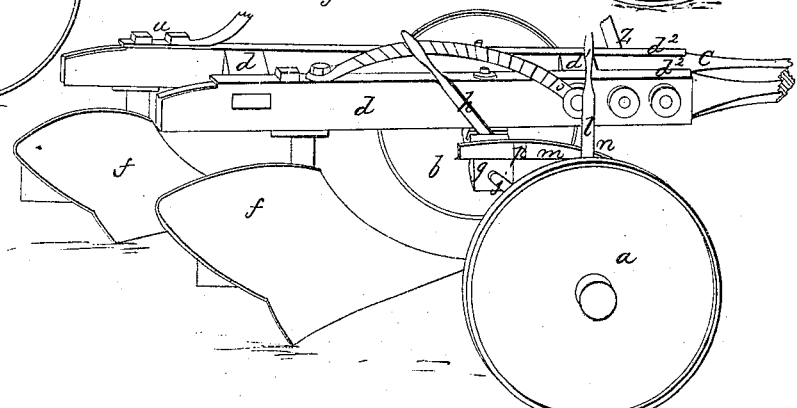
Figure 3 shows the plow in the third position of adjustment, which is for regular labor, the first furrow having been taken.

For regular labor, fig. 3, the first furrow is now taken; let hand-lever $h$ remain as last adjusted, and bring the wheel-lever $l$ straight up into the slot $n$, in the rack $m$, and the plow is ready for regular labor. The furrow-wheel runs in the furrow, the land-wheel on the land, the wheels are just abreast of each other, and the frame is on a level meanwhile. The depth of the furrow can be regulated by means of hand-lever $h$.

Figure 4:
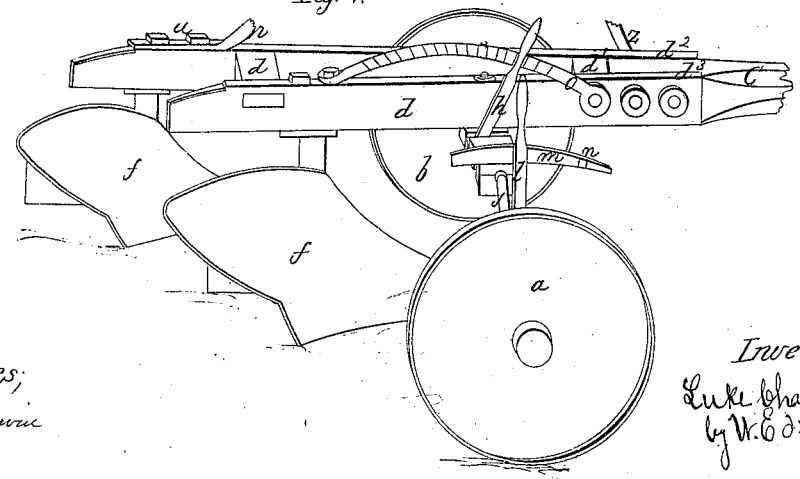
Figure 4 shows the plow in the fourth position of adjustment, which is for raising the plows over a stone or other obstacle.

To pass an obstruction, fig. 4, throw wheel-lever $l$ into slot $p$, and hand-lever $h$ straight up. The plows will be now lifted very high, high enough to pass over any ordinary obstruction. After passing obstruction, readjust for regular labor.

At this point an objection will have occurred to most careful observers, namely, none but a tolerably strong man will be able, while riding upon the machine, to lift himself and the machine by means of the levers.

To make the raising of the plows, rider and all, practical for any person, another lifting-apparatus, styled the "lifting-frame" herein, is attached, by means of which a boy, even, can raise the whole machine.

This apparatus consists of two iron posts, $r$ and $z$, the one, $r$, fastened at $u$ to the frame, and the other, $z$, pivoted at $v$ to the axle $s$ of the land-wheel $b$.

The forward curve, in the lower part of the post $z$, is for the purpose of giving full play to the pulley $w$.

The axle $s$ is fastened rigidly to crank-arm $k$, and then passes on inward a couple of inches or so, for the purpose of giving support to the iron post $z$, whose lower extremity rests upon it in the shape of a fork. A pin, passing through the two branches of the fork, under the axle, fastens the post to the axle, but not rigidly.

These two iron posts, $r$ and $z$, are united at their tops by a short cross-arm, Q, flexibly jointed to both posts.

Near the top of the post $z$ is attached a pair of differential pulleys, $y$, which, with the lower pulley, $w$, and the connecting-chain, are the patent of James Bird, dated December 2, 1866.

Of course it is not intended to use this patent without license, but its application here is a part of my invention.

The pulley $w$ may either be fixed to the end of rider $g$, or loose upon the axle proper, $s'$, or fixed to the axle proper, $s'$. The working-effect is all the same.

This lifting-frame will enable the feeblest person to lift the machine and himself, and the plows will remain suspended at any desired point.

It remains to show how the pole $c$ can be attached when more than two plows are used.

Let the front cross-beam $d^1$ extend along the whole front, attaching as many plows behind as is desirable, and then attach $d^2$ and $d^3$ to $d^1$, so that the draught shall be in the centre of all the plows.

These plows are hung almost close up to the axle proper, $s'$, so close that the weight abaft the axle shall balance the weight forward the axle, or nearly so.

It will probably aid the plow-maker who attempts to work from this specification, to give the dimensions of the principal parts of my machine, using, say, two plows, as shown in the drawings.

In an ordinary full-sized machine, the diameter of the wheels is two feet; length of short beam, four feet six inches; of the long beam, six feet; from the front ends of both beams to the axle proper, twenty-one inches; the length of the axle proper, twenty-eight inches; of the hand-lever, thirty-six inches; the wheel-lever, forty inches; of the crank-arms, twelve inches; on the wheel-lever, from its lower end to the peculiar joint, six inches; the diameter of the differential pulleys, five inches; and the pulleys are raised to the level of the head of a man sitting in the seat.

I claim as my invention—

1. The combination of the frame of the gang-plow, with the cranked axle and wheels, by means of a rider, slotted as described, the whole constructed to operate substantially as before set forth.

2. The rider $g$, slotted substantially as described, for the purpose described.

3. The wheel-lever $l$, jointed in the manner described, to the crank-arm $j$, and pivoted at its lower extremity to the axle of the furrow-wheel $a$.

4. The combination of the jointed wheel-lever, the crank-arm $j$, and the rack $m$, the whole constructed to operate substantially as before set forth.

5. The posts $r$ and $z$, attached, the former to the frame $d$, in the manner described, and the latter to the axle of the land-wheel, in the manner described, connected at the top by the jointed cross-bar Q.

6. The combination of the frame of the gang-plow, the cranked axle $s'$, the lifting-frame, the differential pulleys, and the chain therefor, the whole constructed to operate substantially as before set forth.

7. The combination of the frame of the gang-plow, the rider, the cranked axle, the lifting-frame, the seat, the jointed wheel-lever, the hand-lever and racks, the whole constructed to operate substantially as set forth.

Dated this 16th day of March, 1869.

LUKE CHAPMAN.

Witnesses:
 OLIVER F. PERRY,
 J. H. BIDWELL.